(12) United States Patent
Nazzai et al.

(10) Patent No.: US 6,253,846 B1
(45) Date of Patent: Jul. 3, 2001

(54) INTERNAL JUNCTION REINFORCEMENT AND METHOD OF USE

(75) Inventors: Gregory Richard Nazzai, Kingwood; Timothy John Frank, Houston; Robert Joe Coon, Missouri City, all of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/511,883

(22) Filed: Feb. 23, 2000

Related U.S. Application Data

(60) Provisional application No. 60/121,451, filed on Feb. 24, 1999.

(51) Int. Cl.[7] .............................. E21B 17/10; E21B 23/00; E21B 43/10
(52) U.S. Cl. ......................... 166/242.2; 166/50; 166/207; 166/313
(58) Field of Search .................................... 166/50, 117.5, 166/207, 217, 242.3, 277, 313; 405/150.1; 138/98, 109

(56) References Cited

U.S. PATENT DOCUMENTS

| | | | |
|---|---|---|---|
| 3,358,769 | * 12/1967 | Berry | 166/207 |
| 3,894,131 | * 7/1975 | Speech | 264/36.11 |
| 5,318,122 | 6/1994 | Murray et al. | 166/313 |
| 5,322,127 | 6/1994 | McNair et al. | 166/313 |
| 5,348,095 | * 9/1994 | Worrall et al. | 166/380 |
| 5,366,012 | * 11/1994 | Lohbeck | 166/277 |
| 5,454,419 | * 10/1995 | Vloedman | 166/277 |
| 5,494,106 | * 2/1996 | Gueguen et al. | 166/277 |
| 5,692,543 | * 12/1997 | Wood | 138/98 |

FOREIGN PATENT DOCUMENTS

| | | |
|---|---|---|
| 0 795 679 A2 | 9/1997 | (EP) . |
| WO 98/09054 | 3/1998 | (WO) . |
| WO 99/04135 | 1/1999 | (WO) . |

\* cited by examiner

Primary Examiner—David Bagnell
Assistant Examiner—Jennifer M Hawkins

(57) ABSTRACT

An internal junction stabilizer is formed with an outer dimension less than the internal bore of a junction to be strengthened The stabilizer is inserted into the junction, and expanded into tight fit. Multiple stabilizers may be expanded one inside another to form a laminate for reinforcement in high pressure applications. Each layer of metal expanded to the next outermost section provides an additive effective on the mechanical properties of the junction. Expansion can be performed in a number of ways, including mechanical, hydraulic, explosive methods. Use of directional or selective swaging can be used to further effect a fit. Further embodiments of the invention include the use of sealing compounds, elastomers, and plastics to effect a hydraulic seal and fill gaps for strength purposes.

16 Claims, 3 Drawing Sheets

INTERNAL JUNCTION REINFORCEMENT AND METHOD OF USE

This application claim benefit to U.S. Provisional Application No. 60/121,451, filed Feb. 24, 1999.

BACKGROUND OF THE INVENTION

1. The Field of the Invention

The present invention relates to a reenforcement insert for joints in piping and the like and in particular to a method for forming and placing such an insert.

2. The Prior Art

It is a well-known fact that joints in piping are their weakest points and that this is the main point of wear and subsequent leakage. The term "joint", as used herein, is intended to cover the part or device located at the point where a first pipe is coupled, joined, and/or connected to two or more pipes for the purposes of splitting the flow path from the original single flow path to two or more flow paths regardless of the relative proportions. The joint itself can be weakened to the point of rupture by pressures within the pipe. Also, joints are the points of highest wear when any kind of erosive material is passed through the piping. This further applies to build up of materials at the joints, which materials can also cause degeneration of the joint. Heretofore the answer to the problem of degeneration of pipe joints has been either the replacement of the joint or attempting to enclose the joint within some kind of jacketing. However, both of these approaches are often unsuitable, for example in wells.

One example of the prior art for using a mandrel to expand a pipe is U.S. Pat. No. 5,366,012 which describes a method of completing uncased sections of a borehole by placing, at a predetermined position in the borehole, a slotted liner which is provided with a plurality of overlapping slots. The upper end of the liner is fixed in place and an upwardly tapering expansion mandrel is drawn upwardly through the slotted liner expanding it outwardly to engage the walls of the borehole. Another use of a mandrel to expand pipe is U.S. Pat. No. 5,348,095 in which the mandrel is driven downwardly to expand the pipe. While these concepts may work for straight sections of piping, clearly it would not be readily adaptable for pipe joints.

Another method for creating sealing between a lining and borehole, casing or pipeline is shown in U.S. Pat. No. 5,494,106. This consists of a deformable annular seal which is put in place in a deformed or contracted state, which does not impede insertion. During expansion of the seal it is hardened to form a substantially permanent repair. However, this patent does not suggest how this technology could be applied to pipe junctions to create an improved seal, particularly at the joints and/or seams of the junction where leakage is most likely to occur.

U.S. Pat. No. 3,358,769 show another pipe lining which is inserted into the pipe in a folded or collapsed state and then set when in place. However, this patent does not suggest how such a concept could be applied to a pipe joint.

Another method for inserting a lining into a casing is shown in U.S. Pat. No. 5,454,419 in which a tubular polymeric material is lowered into the well in a stretched condition, due to a series of weights attached to the leading end When properly positioned, the weights are released and the tubular material returns to its normal condition in which it presses against the walls to the borehole. There is no suggestion of how this method could be applied to junctions with multiple legs.

The present invention provides a means to overcome problems not addressed nor solved by the prior art by providing a technique for applying a reinforcing liner to a pipe junction and, in particular, to a pipe junction which can only be reached through the bore of the pipe.

SUMMARY OF THE INVENTION

The internal junction stabilizer, according to the present invention, utilizes at least one expandable section that is inserted through the bore of a pipe and then expanded in place in the junction to both strengthen and seal the junction. Multiple sections may be expanded inside one another to form a laminate to reinforce and provide higher integrity in high pressure applications. The subject invention provides reenforcement to current high stress points or stress risers, which are the weak points in current designs of multilateral junctions. Each layer of metal expanded within the junction provides an additive effective on the overall mechanical properties of the junction. Expansion of the subject internal junction stabilizer can be performed in a number of ways, including mechanical, hydraulic, and explosive, as well as an "unfolding" operation or plastic expansion application. Use of directional or selective swaging can be used to further effect a tight fit Further embodiments of the invention include the use of sealing compounds, elastomers, and plastics to insure a hydraulic seal and fill gaps for strength purposes. These all act to provide bonding of the reinforcement member to the main bore and laterals of the junction.

BRIEF DESCRIPTION OF THE DRAWINGS

The present invention will now be described, by way of example, with reference to the accompanying drawings in which.

DETAILED DESCRIPTION OF A PREFERRED EMBODIMENT

Figure 1:
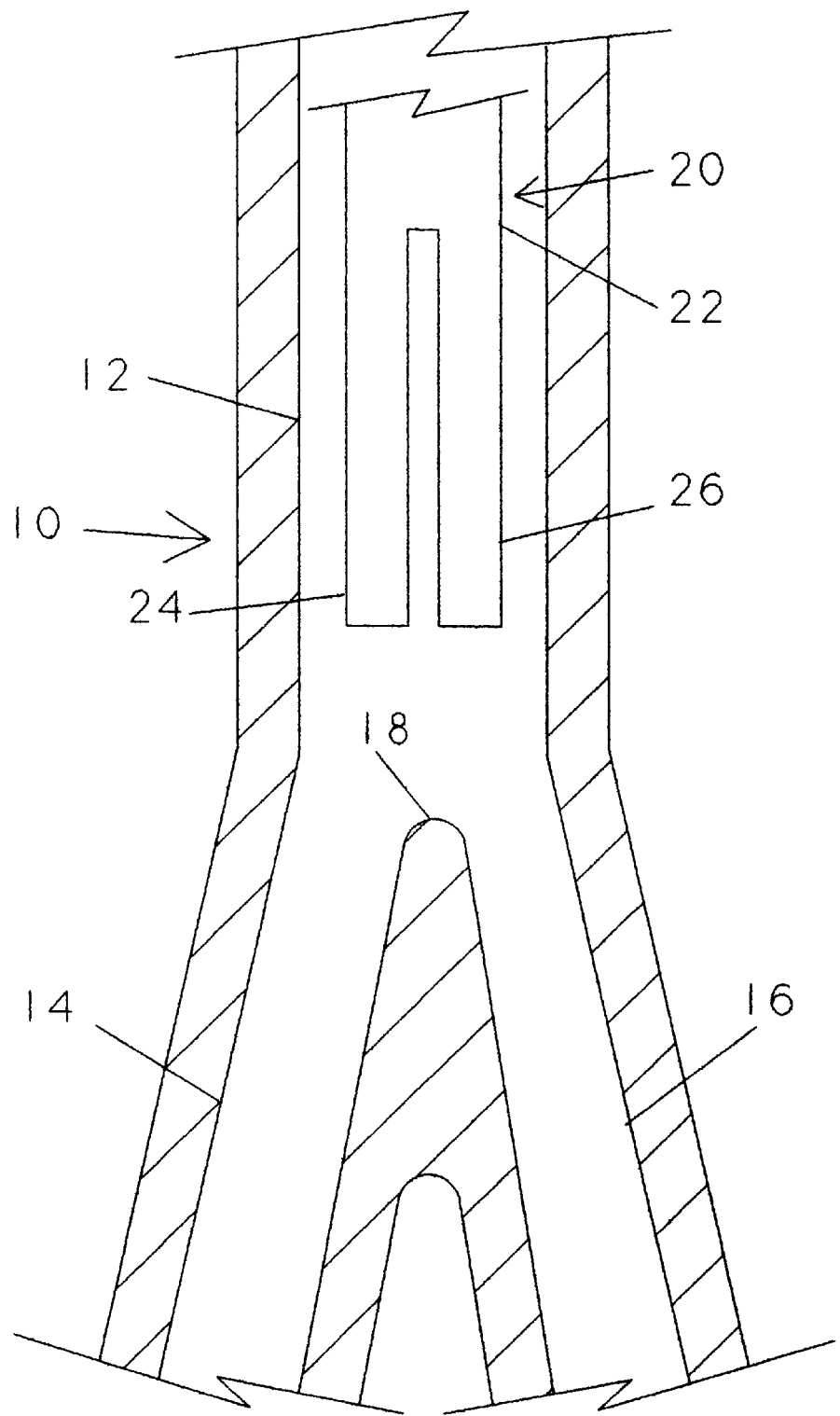
FIG. 1 is a diagrammatic vertical section through a typical pipe junction showing the subject stabilizer prior to placement.
Figure 2:
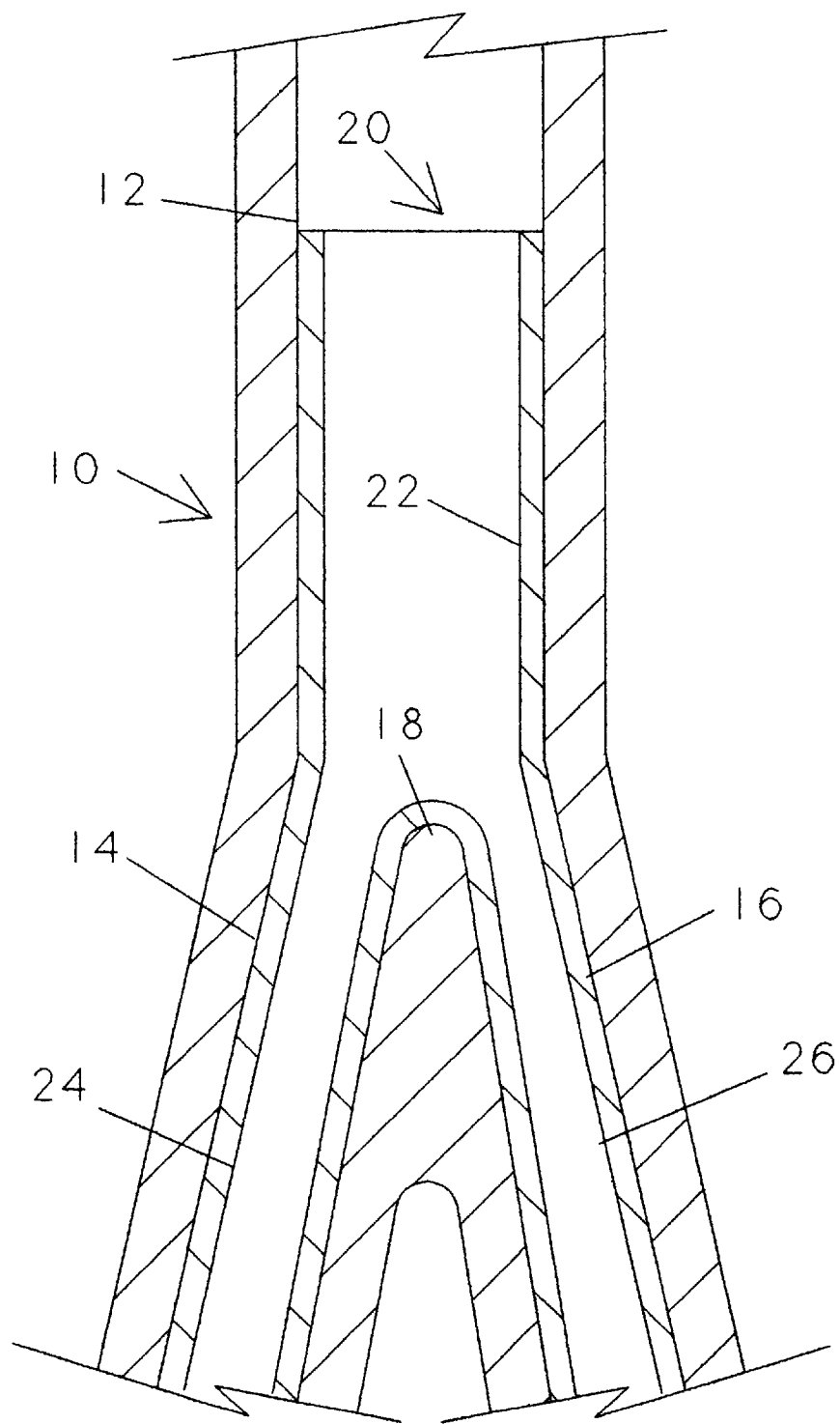
FIG. 2 is a section similar to FIG. 1 with the stabilizer in place and fully expanded.
Figure 3:
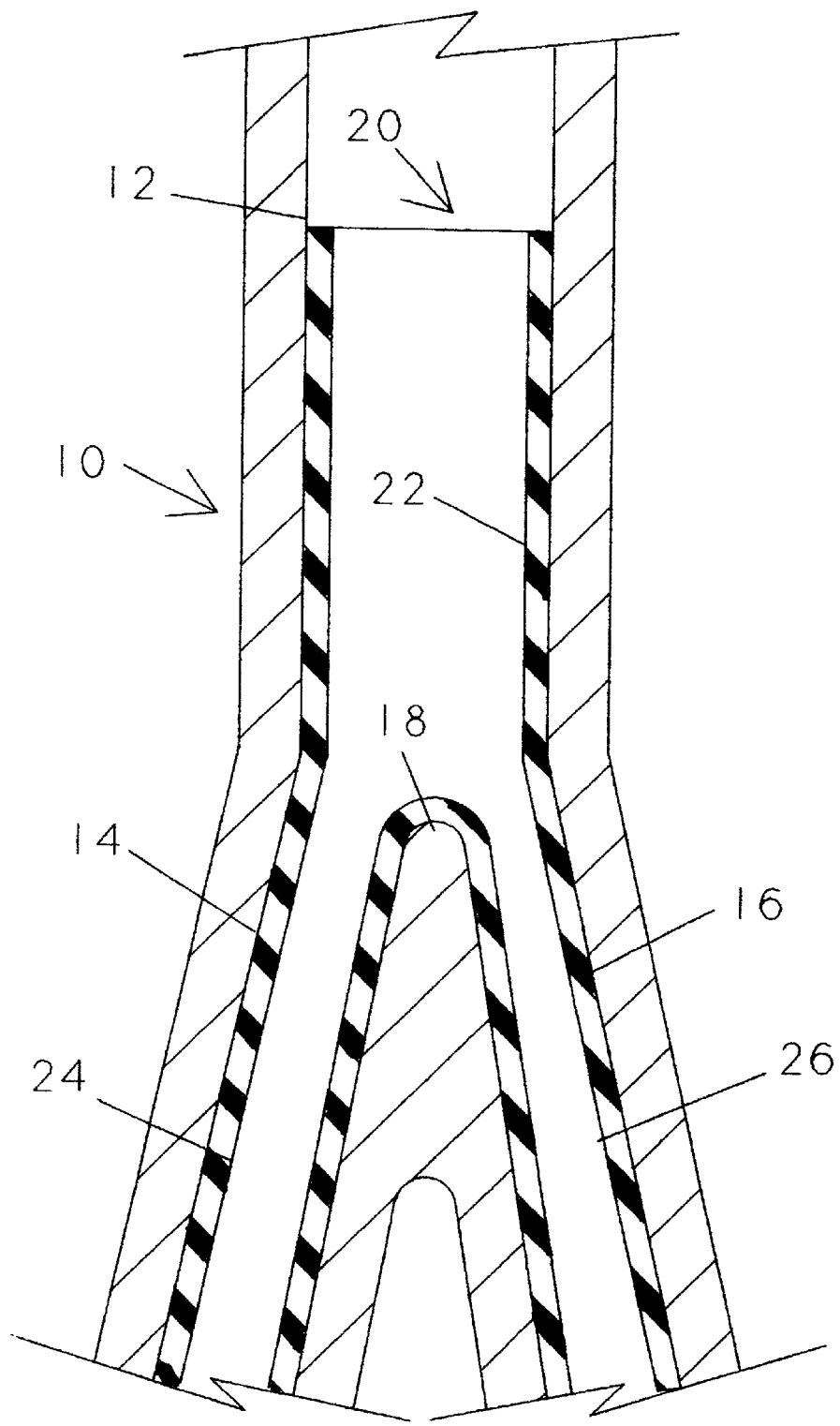
FIG. 3 is a section similar to FIG. 2 showing an alternate material for the stabilizer.

Turning now to the drawings, pipe joint 10 has a main bore 12 and a pair of diverging legs 14, 16. While the intersection 18 is shown as rather substantial, this is not usually the case, particularly for fabricated junctions. The intersection 18 is, in fact, the weakest point in any junction. This is the point where pressures within the junction and the materials flowing through the junction will have their most destructive effect. FIG. 1 also shows, in a collapsed state, the stabilizer insert 20 which has a main body portion 22 and a pair of depending legs 24, 26.

The stabilizer insert would be placed into the junction in a collapsed or retracted state by any of the means well known in industries utilizing pipes. The above-mentioned patents suggest several different methods for reducing the outer diameter of an insert prior to inserting it into position within a pipe. These known techniques would also be utilized to properly orient the insert so that the legs 24, 26 pass into legs 14, 16 of the joint 10. The insert would then be expanded, by any of the techniques discussed below, to tightly engage the entire inner surface of the junction The internal junction stabilizer can utilize multiple expanded sections sequentially expanded, one inside another, to reinforce a joint in order to provide higher integrity in high pressure applications. Likewise, stabilizers can be added at a later time should the original stabilizer develop a defect. Each layer of metal expanded against the next outermost section provides an additive effective on the mechanical properties of the junction. The subject internal junction stabilizer is applicable in both performed and custom fit junctions and, while only two diverging legs of a junction are shown, there is no reason why the present invention could not be applied to junctions having any number of diverging legs. In fact, junctions with more than two legs would most likely be weaker than a two-leg junction and therefor be more in need of reinforcement.

Expansion of the internal junction stabilizer can be performed in a number of ways and the mode of expansion would largely depend upon the material used to form the stabilizer. For example, almost any known mechanical, hydraulic, or even explosive method could be used to expand metal stabilizers. Further "unfolding" operations or plastic expansion could be used, again depending upon the materials, the condition of the junction, and the application of the junction Use of directional or selective swaging would also be options to achieve the desired fit.

Further embodiments of the invention could include sealing compounds, elastomers, and plastics materials to effect a hydraulic seal and fill gaps for strength purposes These all act to provide bonding of the junction stabilizer to the main bore and laterals of the junction.

After a multilateral is made, the reinforcing stabilizer is run in the pipe bore, positioned inside the junction depending into the legs thereof, and expanded outward to clad against the initial junction configuration.

The present invention can be accomplished with a variety of material well know to those skilled in the art. For example, when pressure is to be maintained within the junction, then an expandable metal would be preferred This could be applied by inserting a collapsed member and then expanding it through the use of mandrels and the like. Similarly, an explosive charge could be utilized to create a concussive force sufficient to drive the metal tightly against the walls of the junction. It would also be possible to use memory metals which can be formed, stabilized, compacted, and restored to their original shape lining the walls of the junction If the intention was to reduce friction with the material passing through the pipe and /or the erosive effects of the material on the pipe junction, then the junction could be coated with an epoxy resin or clad with an insert of plastics material. This could be applied by any of the well-known methods such as in the form of a spray coating or sintering.

It might appear that the subject invention would require the use of means to orient the liner in order for it to be correctly placed in the joint Such orientation means are well known in the drilling industry and need not be described in detail here. There are many mechanical ways to accomplish orientation. For example, often the joint will form arms of two different diameters. This feature can be used to correctly insert the stabilizer into the junction. If the arms of the junction are equal in diameter, then one leg of the stabilizer can be made slightly longer than the other to engage in the junction and allow rotation of the stabilizer into position for final insertion.

The present invention may be subject to many modifications and change which would occur to one skilled in the art. Thus the described embodiment should be considered in all respects as illustrative and not restrictive of the scope of the subject invention as defined by the accompanying claims.

We claim:

1. A stabilizer that reinforces junctions in pipes said stabilizer comprising:
    a single member of substantially imperforate, deformable material have a first body portion and at least a pair of integral secondary body portions joined to one end of said first body portion and depending therefrom at a predetermined angular relationship;
    whereby said member being received in the pipe to be reinforced with the first body portion lying within the pipe and the secondary body portion lying within the respective portions of the junction.

2. A stabilizer according to claim 1 further comprising:
    orientation means fixed to said stabilizer to orient said stabilizer for correct positioning thereof into the pipe junction to be reinforced.

3. A stabilizer according to claim 1 wherein said member is formed from an metal alloy having memory wherein said member is formed in an original shape, memorized by the metal, the member is compressed to a smaller size so as to be insertable into the pipe, the member is positioned within the joint and the memory enabled to restore the member to its original shape.

4. A stabilizer according to claim 1 wherein said member is formed from plastics material.

5. A stabilizer according to claim 1 wherein said member is formed from metal readily deformable by an expansive force within the member.

6. A stabilizer according to claim 1 wherein said member is formed from metal deformable by mechanical forces applied from within the member.

7. A stabilizer according to claim 1 wherein said member is formed from an epoxy material.

8. A method for applying a stabilizer into junctions in pipes for the purpose of reinforcing the pipe junction, comprising the steps of:
    providing a single member of substantially imperforate, deformable material have a first body portion and at least a pair of integral secondary body portions joined to one end of said first body portion and depending therefrom at a predetermined angular relationship;
    inserting said member into a pipe junction while in a state in which the outer dimensions of said insert are less than the internal dimensions of said joint, said member being received in the pipe to be reinforced with the first body portion lying within the pipe and the secondary body portions lying within the respective portions of the junction; and
    expanding said member in place to form a stabilizing reinforcement for said junction.

9. A method according to claim 8 further comprising:
    orienting said stabilizing member for correct positioning of the stabilizer into the junction to be reinforced.

10. A method according to claim 8 wherein said member is formed from an metal alloy having memory wherein said member is formed in an original shape, memorized by the metal, the member is compressed to a smaller size so as to be insertable into the pipe, the member is positioned within the junction and the memory enabled to restore the member to its original shape.

11. A method according to claim 8 wherein said member is formed from plastic material.

12. A method according to claim 8 wherein said member is formed from metal readily deformable by a expansive force within the member.

13. A method according to claim 8 wherein said member is formed from metal deformable by mechanical forces applied from within the stabilizer.

14. A method according to claim 8 wherein said member is formed from an epoxy material.

15. A method according to claim 8 wherein said member is expanded by fluid pressure applied within said stabilizer.

16. A method according to claim 8 where hydraulic deformation is used to expand said member.

* * * * *

UNITED STATES PATENT AND TRADEMARK OFFICE
CERTIFICATE OF CORRECTION

PATENT NO.     : 6,253,846 B1
DATED          : July 3, 2001
INVENTOR(S)    : Gregory Richard Nazzal, Timothy John Frank and Robert Joe Coon It is certified that error appears in the above-identified patent and that said Letters Patent is hereby corrected as shown below:

<u>Title page,</u>
Item [75], Inventor's name "Gregory Richard Nazzai" should be -- Gregory Richard Nazzal --.
Item [12], "Nazzai et al" should read -- Nazzal et al --

Signed and Sealed this

Twelfth Day of November, 2002

Attest:

Attesting Officer

JAMES E. ROGAN
*Director of the United States Patent and Trademark Office*